(12) United States Patent
Liu

(10) Patent No.: US 8,973,587 B2
(45) Date of Patent: *Mar. 10, 2015

(54) ELECTRONIC CIGARETTE DEVICE

(75) Inventor: Qiuming Liu, Shenzhen (CN)

(73) Assignee: Kimree Hi-Tech Inc., Tortola (VG)

( * ) Notice: Subject to any disclaimer, the term of this patent is extended or adjusted under 35 U.S.C. 154(b) by 166 days.

This patent is subject to a terminal disclaimer.

(21) Appl. No.: 13/699,640

(22) PCT Filed: Aug. 24, 2012

(86) PCT No.: PCT/CN2012/080544

§ 371 (c)(1),
(2), (4) Date: Nov. 23, 2012

(87) PCT Pub. No.: WO2014/029103

PCT Pub. Date: Feb. 27, 2014

(65) Prior Publication Data

US 2014/0053857 A1    Feb. 27, 2014

(51) Int. Cl.
*A24F 47/00*    (2006.01)
*H02J 7/00*    (2006.01)

(52) U.S. Cl.
CPC .............. *A24F 47/002* (2013.01); *A24F 47/008* (2013.01); *H02J 7/00* (2013.01)
USPC .............................. 131/273; 131/329; 320/114

(58) Field of Classification Search
USPC ................................ 320/107–115; 128/202.21
See application file for complete search history.

(56) References Cited

U.S. PATENT DOCUMENTS

| 4,489,268 | A * | 12/1984 | Beachy | 320/106 |
| 2011/0089891 | A1* | 4/2011 | Pai | 320/107 |
| 2011/0089892 | A1* | 4/2011 | Lin | 320/107 |
| 2012/0199146 | A1* | 8/2012 | Marangos | 131/328 |
| 2012/0227753 | A1* | 9/2012 | Newton | 131/347 |
| 2014/0014124 | A1* | 1/2014 | Glasberg et al. | 131/328 |

\* cited by examiner

*Primary Examiner* — Richard Crispino
*Assistant Examiner* — Eric Yaary
(74) *Attorney, Agent, or Firm* — Cheng-Ju Chiang

(57) ABSTRACT

This invention relates to an electronic cigarette device, including an electronic cigarette and an electronic cigarette charger, the electronic cigarette charger forming a first magnetic portion, the electronic cigarette correspondingly forming a second magnetic portion mutually magnetically adsorbed with the first magnetic portion. The electronic cigarette charger forms a first connector, and the first connector comprises a first seat, a first electrode pole disposed at a middle portion of the first seat and a first insulating sleeve disposed between the first seat and the first electrode pole to insulate the first seat and the first electrode pole. The electronic cigarette forms an electronic cigarette battery therein, and the electronic cigarette at an end thereof forms a second connector connected with the electronic cigarette battery and the first connector of the electronic cigarette charger. The electronic cigarette device is convenient to put/take the electronic cigarette into/out of the electronic cigarette charger.

15 Claims, 9 Drawing Sheets

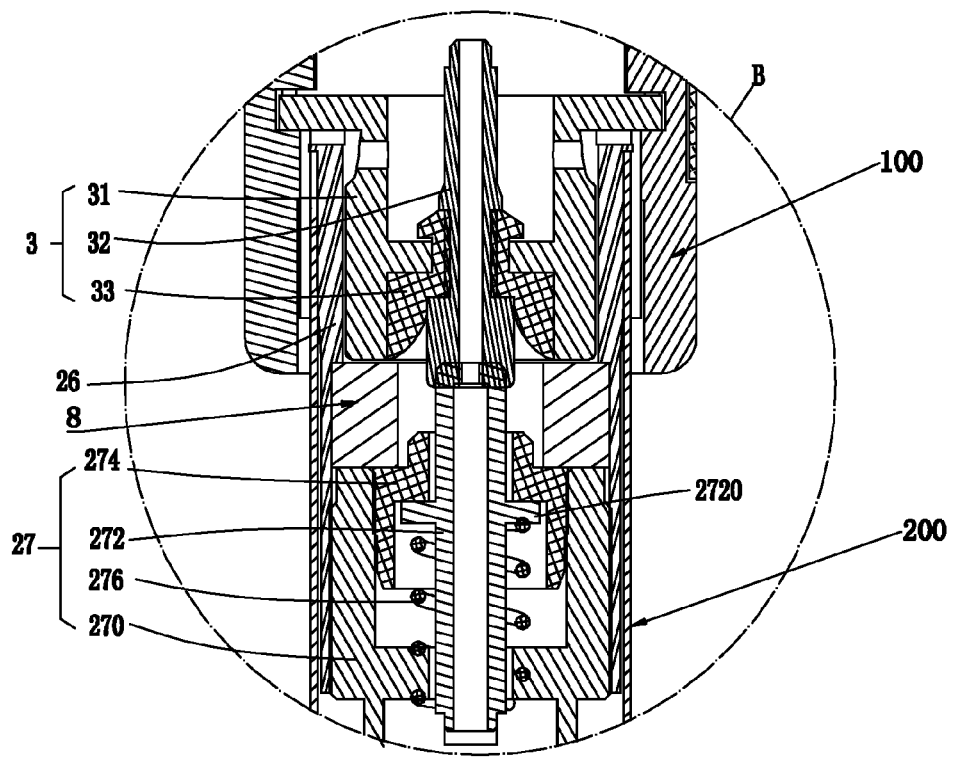
FIG. 6
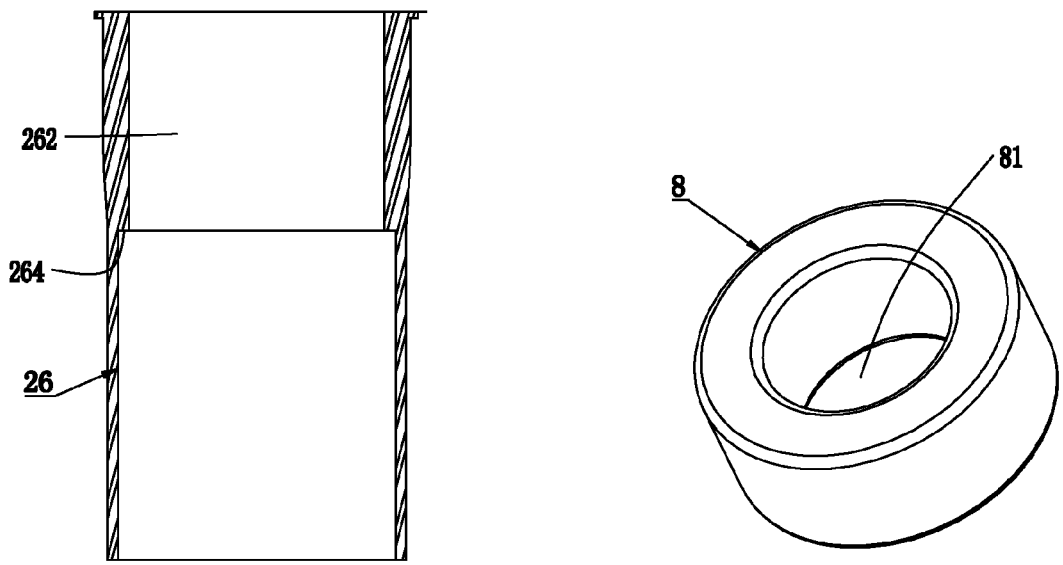
FIG. 7
FIG. 8

US 8,973,587 B2

ELECTRONIC CIGARETTE DEVICE

CROSS REFERENCE TO RELATED APPLICATIONS

The present application is a 35 U.S.C. §371 National Phase conversion of International (PCT) Patent Application No. PCT/CN2012/080544, filed on Aug. 24, 2012, the disclosure of which is incorporated by reference herein. The PCT International Patent Application was filed in Chinese.

TECHNICAL FIELD

This invention relates to a field of electronic simulating cigarettes, and especially relates to an electronic cigarette device connected to a charger by magnetic adsorption force.

DESCRIPTION OF BACKGROUND

Electronic cigarette device includes an electronic cigarette and an electronic cigarette charger used for charging the electronic cigarette. The existing electronic cigarette comprises a sucking rod and a power rod, the sucking rod and the power rod are usually connected together through threads, when in charging, the sucking rod and the power rod are usually taken apart in order that the power rod is inserted into a charging socket of the electronic cigarette charger for charging. The existing electronic cigarette charger comprises: a case body, a power assembly arranged in the box body for charging the power rod; the power assembly includes an external power interface, a PCB board and a first connector, the first connector is a copper sleeve member with inner thread, the power rod is correspondingly provided with a second connector, when the power rod is inserted into the charging socket, the second connector and the first connector are correspondingly connected to achieve charging. In the existing electronic cigarette device, the second connector and the first connector are connected through threads, this connecting mode results in much inconvenience of putting the power rod into the charging socket and taking the power rod out of the charging socket.

SUMMARY

An object of the present invention is to provide an electronic cigarette device capable of getting convenience of putting the electronic cigarette into the electronic cigarette charger and taking the electronic cigarette out of the electronic cigarette charger.

To achieve the above object, the present invention provides an electronic cigarette device, comprising an electronic cigarette and an electronic cigarette charger used for charging the electronic cigarette, the electronic cigarette charger forms a first magnetic portion at a position of docking with the electronic cigarette, while the electronic cigarette correspondingly forms a second magnetic portion mutually magnetically adsorbed with the first magnetic portion in order to make the electronic cigarette and the electronic cigarette charger to be stably docked.

Furthermore, the electronic cigarette charger forms a first connector at the position of docking with the electronic cigarette, and the first connector comprises a first seat, a first electrode pole disposed at a middle portion of the first seat and a first insulating sleeve disposed between the first seat and the first electrode pole to insulate the first seat and the first electrode pole.

Furthermore, the first seat is made of conductive magnet or magnetic material to construct the first magnetic portion, or the first connector forms an independent structural member thereon made of conductive magnet or magnetic material to construct the first magnetic portion.

Furthermore, the electronic cigarette charger comprises a case body and a power assembly disposed in the case body for charging the electronic cigarette.

Furthermore, the power assembly comprises the first connector, an external power connector and a PCB board electrically connected with the first connector and the external power connector and having a charging control circuit, and the first seat of the first connector and the first electrode pole both are electrically connected to the PCB board through conductive wires.

Furthermore, the external power connector and the first connector are respectively disposed at opposite ends of the case body, and the case body forms a first locking slot in one end thereof for mounting the first connector.

Furthermore, the first locking slot further forms an embedded slot at an inner wall thereof for mounting the first seat, correspondingly, the first seat forms a protruding ring at an outer wall thereof, and the first connector is embedded in the embedded slot by means of the protruding ring.

Furthermore, the external power connector is an USB connector.

Furthermore, the external power connector is securely mounted to an end of the case body and protruded out of the case body.

Furthermore, the external power connector is movably mounted to an end of the case body and capable of being protruded out of the case body.

Furthermore, the external power connector is slidably and retractably disposed at said end of the case body; or the external power connector has a wiring structure, which comprises a power interface protruded out of the case body and conductive wires respectively electronically connected with the power interface and the PCB board; or the external power connector has a rotatable structure, its power interface is pivoted to the case body and received in a corresponding receiving slot of the case body, and the power interface is electrically connected to the PCB board through conductive wires.

Furthermore, the electronic cigarette comprises a power rod, the power rod as a whole is cylindrical, the power rod forms an electronic cigarette battery therein, the power rod at one end thereof further forms a second connector connected with the electronic cigarette battery and docked with the first connector of the electronic cigarette charger.

Furthermore, the second connector comprises a second seat, a second electrode pole disposed at a central portion of the second seat and a second insulating sleeve disposed between the second seat and the second electrode pole for insulating the second seat and the second electrode pole, and the second seat and the second electrode pole are respectively connected with the positive and negative of the electronic cigarette battery inside of the power rod.

Furthermore, the second seat is made of conductive magnet or magnetic material to construct the second magnetic portion, or the second connector forms an independent structural member thereon made of conductive magnet or magnetic material to construct the second magnetic portion.

Furthermore, the second electrode pole is extended through the second insulating sleeve, the second electrode pole forms a retaining ring at an end thereof close to an inside of the second seat, and the second electrode pole is sleeved with a spring at the end thereof close to the inside of the second seat, and opposite ends of the spring respectively abut against the retaining ring and an inner end-wall of the second seat to hold the second electrode pole in a protruding state.

Adopting above technical solutions, the present invention has the following beneficial effects: when the electronic cigarette is inserted into the electronic cigarette charger, the electronic cigarette and electronic cigarette charger can be easily and stably connected by means of the magnetic adsorption of the first magnetic portion and the second magnetic portion, the connection structure is simple and it is convenient for operation.

The embodiments of the present invention will be described in further detail below in conjunction with the accompanying drawings.

DESCRIPTION OF THE DRAWINGS

FIG. 6 is an enlarged view of part B of FIG. 5.

FIG. 7 is a cross-sectional view of a connecting sleeve of a second connector in the connected power rod of the first embodiment of the present invention.

FIG. 8 is a perspective view of a permanent magnet in the connected power rod of the first embodiment of the present invention.

DETAILED DESCRIPTION OF THE EMBODIMENTS

Figure 1:
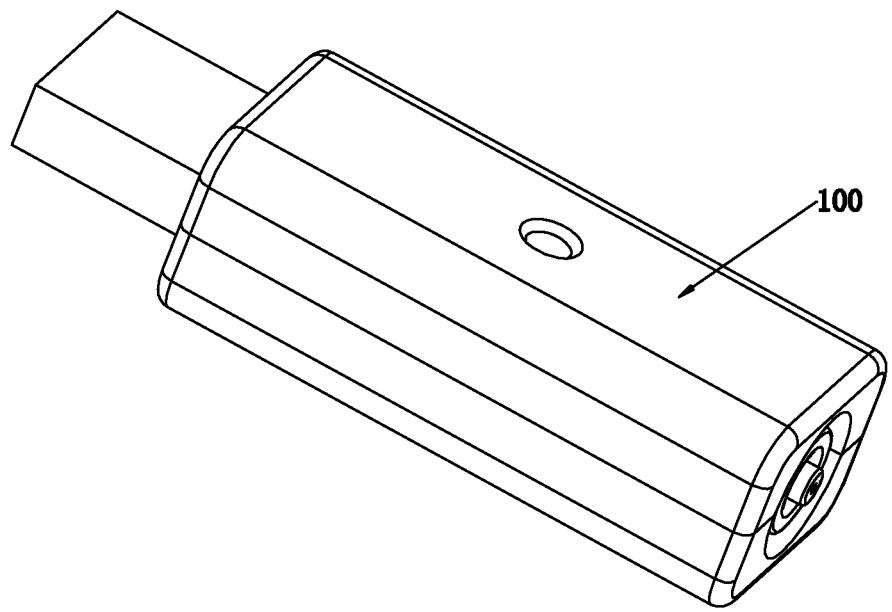
FIG. 1 is a perspective view of an electronic cigarette charger of a first embodiment of the present invention.
Figure 2:
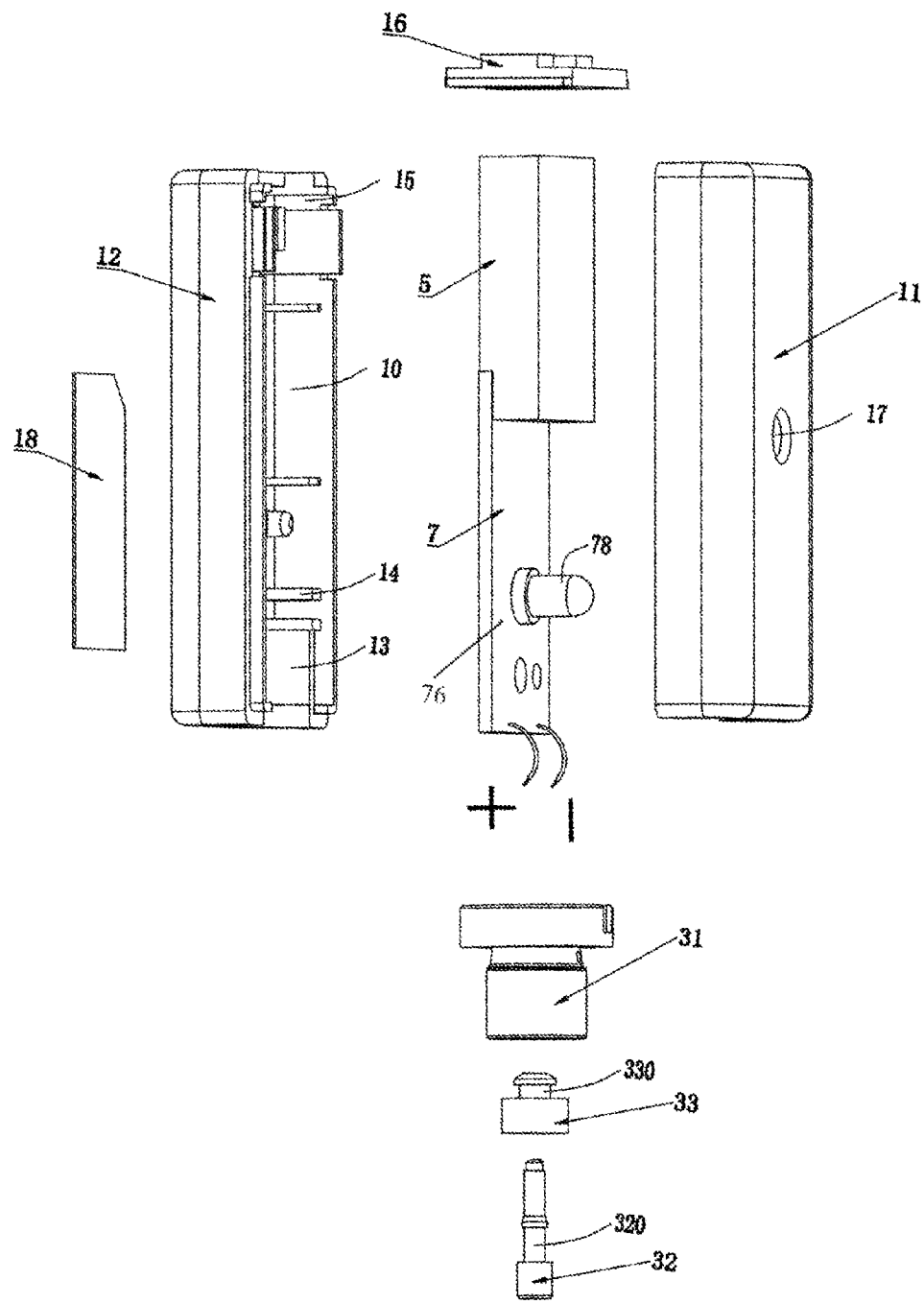
FIG. 2 is an exploded view of the electronic cigarette charger of the first embodiment of the present invention.

As shown in FIGS. 1-15, the present invention provides an electronic cigarette device, comprising an electronic cigarette charger 100 and an electronic cigarette having a power rod 200, the electronic cigarette charger 100 is used for charging the power rod 200 of the electronic cigarette.

As shown in FIGS. 1-6, the electronic cigarette charger 100 of a first embodiment of the present invention comprises a case body 1 forming a hollow internal chamber 10, a first connector 3 configured at an end of the case body 1 and used for charging the electronic cigarette, and a power assembly 7 including an external power connector 5. When the power rod 200 is plugged into the first connector 3, it is capable of being electrically connected with the power assembly 7 to achieve charging.

The case body 1 is of rectangular shape as usual cigarette case, of course, it can also be designed to have various beautiful shapes such as cylinder, elliptic cylinder, polygonal prism etc. The case body 1 comprises an upper cover 11 and a lower cover 12 mutually buckled to form the internal chamber 10, the case body 1 have one end thereof used for mounting of the external power connector 5, and another end thereof used for mounting of the first connector 3, the case body 1 forms a first locking slot 13 at one end thereof for mounting the first connector 3, and the first locking slot 13 further forms an embedded slot 14 at an inner wall thereof. The case body 1 at another end thereof forms a second locking slot 15 and a baffle 16 used for fixedly locking the external power connector 5, and the external power connector 5 is securely mounted to the case body 1 and protruded out of the case body 1. The upper cover 11 is provided with an indicator hole 17, while the lower cover 12 defines a countersunk hole at an outer wall thereof for installing screws to fasten the upper cover 11 and the lower cover 12, a cover plate 18 for sealing the countersunk hole is provided outside of the countersunk hole.

The power assembly 7 comprises the first connector 3 used for being connected with the power rod 300 for charging, the external power connector 5, a PCB board 76 electrically connected with the external power connector 5 and having a charging control circuit, and an indicator 78. The first connector 3, the external power connector 5 and the indicator 78 all can be integrated onto the PCB board 76, for easy modular production and assembly. In the embodiment, the external power connector 5 is an USB connector, which is fixedly installed on the case body 1 and protruded out of the case body 1, and the USB connector adopts USB port. Understandably, the external power connector 5 can also be replaced by a rechargeable storage battery, and the storage battery serves as the power supply for charging the power rod 200 of the electronic cigarette.

Figure 3:
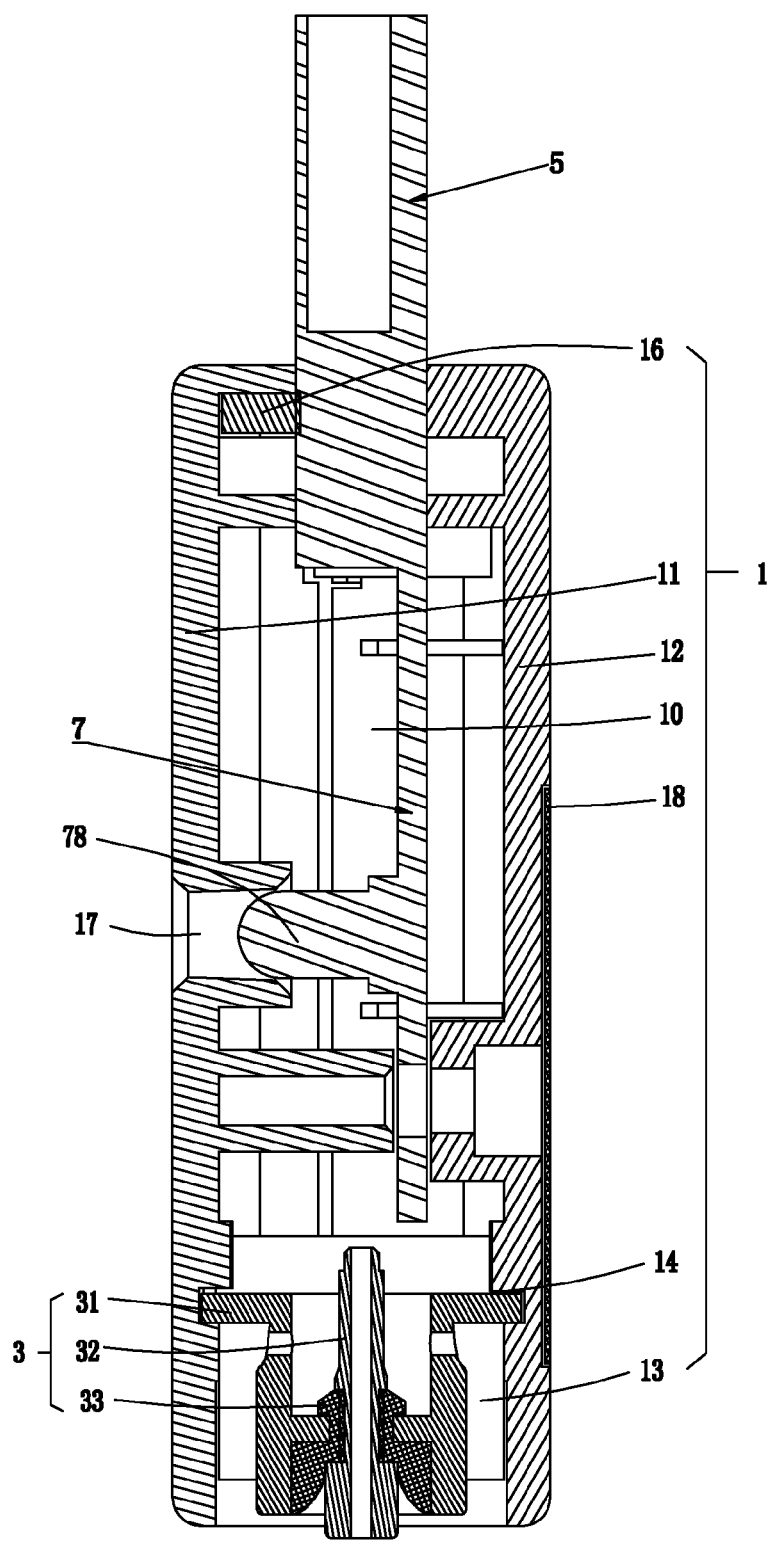
FIG. 3 is a cross-sectional view of an electronic cigarette charger of the first embodiment of the present invention.
Figure 4:
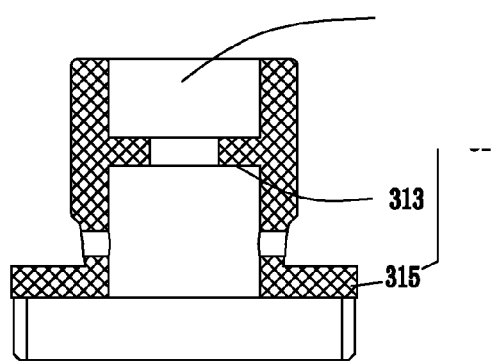
FIG. 4 is a cross-sectional view of a first seat of a first connector of an electronic cigarette charger of the first embodiment of the present invention.

The first connector 3 is correspondingly disposed in the first locking slot 13, and comprises a first seat 31 serving as a first electrode, a first electrode pole 32 disposed at a middle portion of the first seat 31 for serving as a second electrode, and a first insulating sleeve 33 disposed between the first seat 31 and the first electrode pole 32, the first seat 31 and the first electrode pole 32 are electrically insulated through the first insulating sleeve 33, and the first seat 31 and the first electrode pole 32 both are electrically connected to the PCB board 76 through conductive wires. As shown in FIG. 4, the first seat 31 has a substantially cylindrical structure, the first seat 31 forms a through hole 311 therein, and the through hole 311 forms a locking ring 313 on an inner wall thereof. The first seat 31 is embedded in the first locking slot 13 of the case body 1, in order to effectively secure the first seat 31 in the embedded slot 14, the first seat 31 forms a protruding ring 315 at an outer wall thereof, and is embedded in the embedded slot 14 (as shown in FIG. 3) by means of the protruding ring 315. The first insulating sleeve 33 is sleeve-shaped, and defines an inner sleeve hole (not labeled) at a centre thereof, the first insulating sleeve 33 forms a locking slot 330 at an outer wall thereof, and the first insulating sleeve 33 is secured to the first seat 31 by correspondingly locking of the locking slot 330 with the locking ring 313 of the through hole 311. The first electrode pole 32 is substantially column-shaped, and forms a locating slot 320 at an outer wall thereof, used for engaging with the inner sleeve hole of the first insulating sleeve 33 in order to secure the first electrode pole 32 into the first insulating sleeve 33.

As shown in FIGS. 5-8, the power rod 200 of the electronic cigarette is mainly in cylindrical structure, and forms therein a connecting sleeve 26, an electronic cigarette battery 28 and a controlling circuit board 29 etc.. The power rod 200 further forms a second connector 27 at an end thereof which is capable of being engagingly connected with the first connector of the power assembly 7, as shown in FIG. 6, the second connector 27 comprises a second seat 270, a second electrode pole 272 disposed at a central portion of the second seat 270 and a second insulating sleeve 274 disposed between the second seat 270 and the second insulating sleeve 274. The second seat 270 and the second electrode pole 272 are electrically insulated through the second insulating sleeve 274, and the second seat 270 and the second electrode pole 272 are respectively connected with the positive and negative of the electronic cigarette battery 28 inside of the power rod 200. The second electrode pole 272 is extended through the second insulating sleeve 274, and one end thereof is protruded out to abut against a corresponding electrode pole of an external connector, and the second electrode pole 272 further forms a retaining ring 2720 at an end thereof close to an inside of the second seat 270, and the second electrode pole 272 is further sleeved with a spring 276 at the end thereof close to the inside of the second seat 270, opposite ends of the spring 276 respectively abut against the retaining ring 2720 and an inner end-wall of the second seat 270, the spring 276 holds the second electrode pole 272 in a protruding state. The end of the power rod 200 where the second connector 27 is formed further forms the connecting sleeve 26 as shown in FIG. 7, the second connector 27 is disposed at an end near the inside of the connecting sleeve 26 by the inside, while an end near the outside of the connecting sleeve 26 forms a plug hole 262 pluggably connected with a front end of the first seat 31 of the first connector 3, the plug hole 26 at its bottom wall forms a stopper portion 264 used for restricting the second connector 27.

Figure 5:
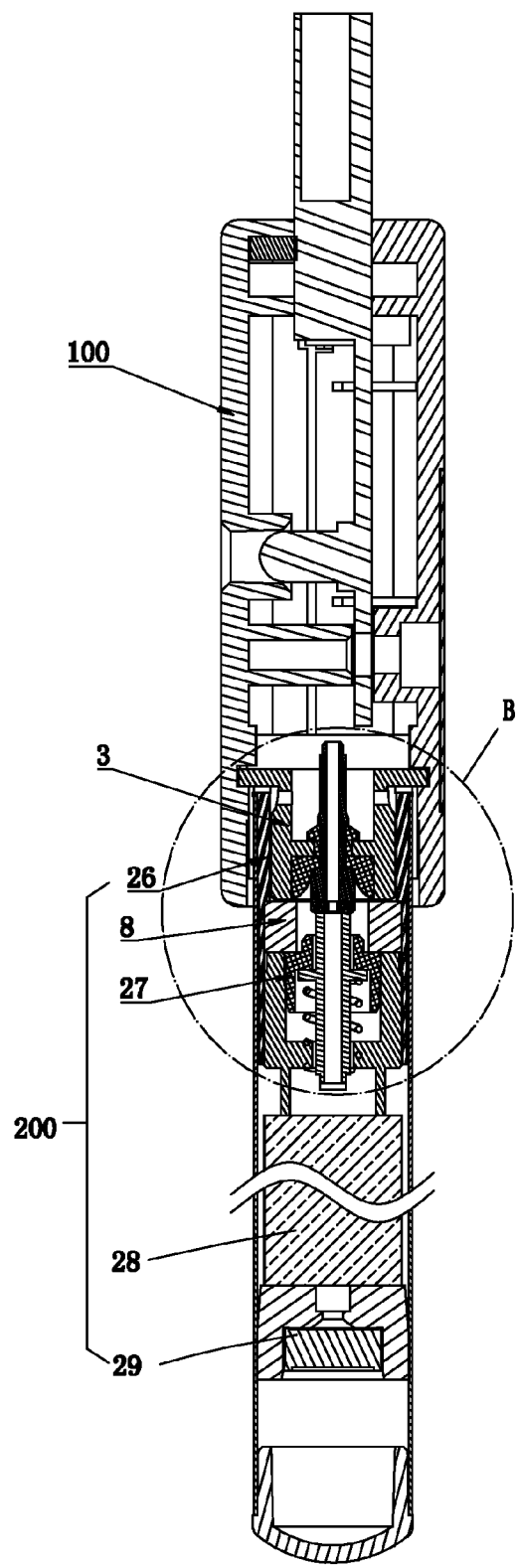
FIG. 5 is a schematic view of the electronic cigarette charger connected with a power rod of the electronic cigarette for charging.

In order to facilitate to get better positioning and securing during docking of the second connector 27 of the power rod 200 with the first connector 3 of the power assembly 7, the first seat 31 of the first connector 3 can be made of conductive magnet or magnetic material, and the magnetic material can be a ferrous material, so that the first seat 31 as a whole constructs a first magnetic portion, it can also be that the first connector forms an independent structural member thereon made of conductive magnet or magnetic material to construct the first magnetic portion. Correspondingly, the second seat 270 of the second connector 27 can also be made of conductive magnet or magnetic material, so that the second seat 270 as a whole constructs a second magnetic portion capable of correspondingly magnetic adsorbing the first magnetic portion, it can also be that the second connector 27 forms an independent structural member thereon made of conductive magnet or magnetic material to construct the second magnetic portion. In the power rod 200 as shown in FIG. 5 and FIG. 6, an independently designed magnetic ring 8 made of magnet or magnetic material is adopted as the second magnetic portion, the magnetic ring 8 defines a central through hole 81 (as shown in FIG. 8) for extension of the second electrode pole 272. Therefore, the first magnetic portion and the second magnetic portion can have matching relationship of magnet and magnet, magnet and magnetic material, or magnetic material and magnet.

As shown in FIG. 5 and FIG. 6, after the power rod 200 is plugged into the first locking slot 13 and plugged into the right place, the second connector 27 is docked with the first connector 3 of the electronic cigarette charger 100, at this time, the second seat 270 of the second connector 27 abuts against the first seat 31 of the first connector, while the second electrode pole 272 of the second connector is abutted against by the end of the first electrode pole 32 of the first connector 3 to overcome the elastic force of the spring 276 to be slightly retracted and abuts against the first electrode pole 32 under the action of the spring 276, ensuring a good contact between the first electrode pole 32 and the second electrode pole 272, thus to realize a corresponding conduction of circuits of the power assembly 7 to internal circuits of the power rod 200, for thereby charging the electronic cigarette battery 28 in the power rod 200. At the same time, the first magnetic portion and the second magnetic portion are mutually magnetically absorbed with each other to securely dock the power rod 200 with the first connector 3, to ensure stable circuit connection during charging. Furthermore, to be located by magnetic adsorption principle, the plug and unplug operations of the power rod 200 are greatly simplified.

The present invention can include appropriate improvements and modifications on the basis of the above embodiment, for example: the positions of the first connector 3 and the second connector 27 can be interchanged.

Figure 9:
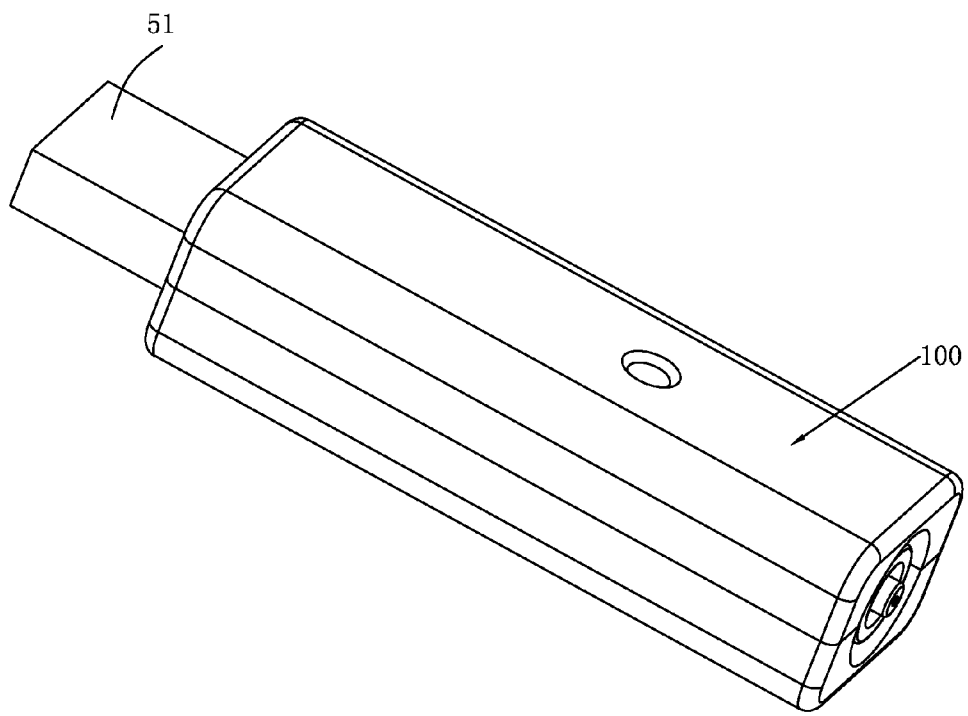
FIG. 9 is a using state view of an electronic cigarette charger of a second embodiment of the present invention.
Figure 10:
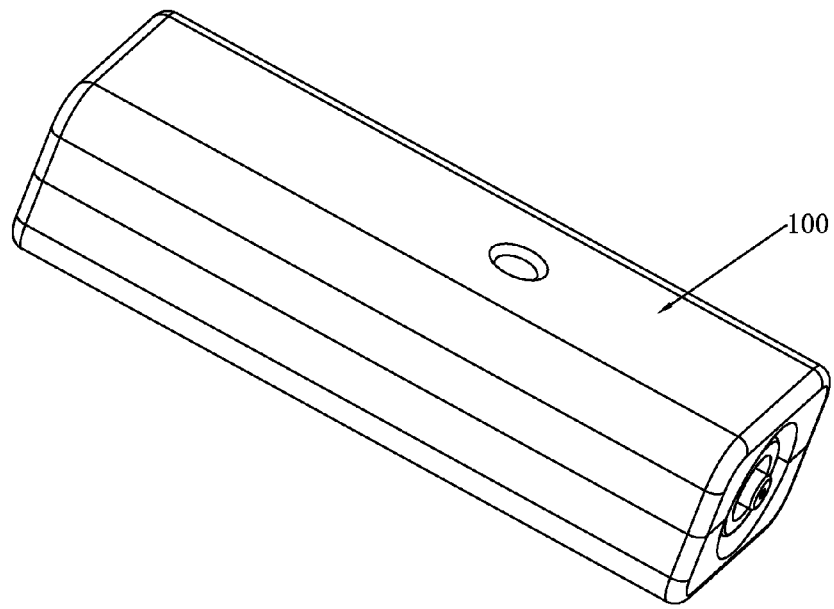
FIG. 10 is a non-using state view of the electronic cigarette charger of a second embodiment of the present invention.

As shown in FIG. 9 and FIG. 10, an electronic cigarette charger 100 of a second embodiment of the present invention has a similar structure as the electronic cigarette charger 100 of the first embodiment, the difference is that, the external power connector 5 adopts a sliding retractable structure, that is the power interface 51 of the external power connector 5 can slidably project out of the case body 1 (as shown in FIG. 9) or retract into the case body 1 (as shown in FIG. 10), the power interface 51 is electrically connected to the PCB board 76 through conductive wires.

Figure 11:
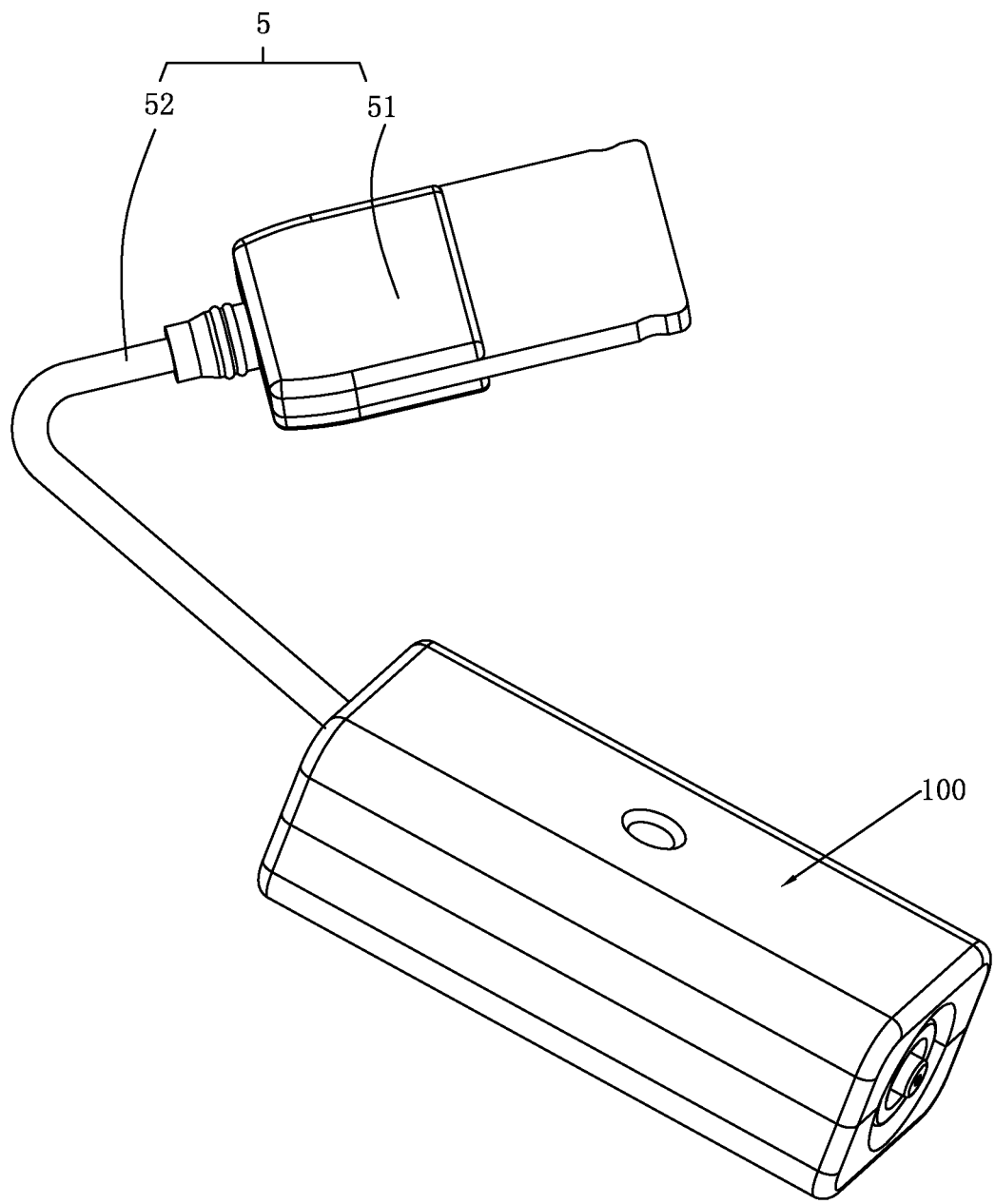
FIG. 11 is a using state view of an electronic cigarette charger of a third embodiment of the present invention.

As shown in FIG. 11, an electronic cigarette charger 100 of a third embodiment of the present invention has a similar structure as the electronic cigarette charger 100 of the first embodiment, the difference is that, the external power connector 5 adopts a wiring structure, that is the power interface 51 of the external power connector 5 is disposed outside of the case body 1 and electrically connected to the PCB board 76 of the power assembly 7 through a conductive wire 52.

Figure 12:
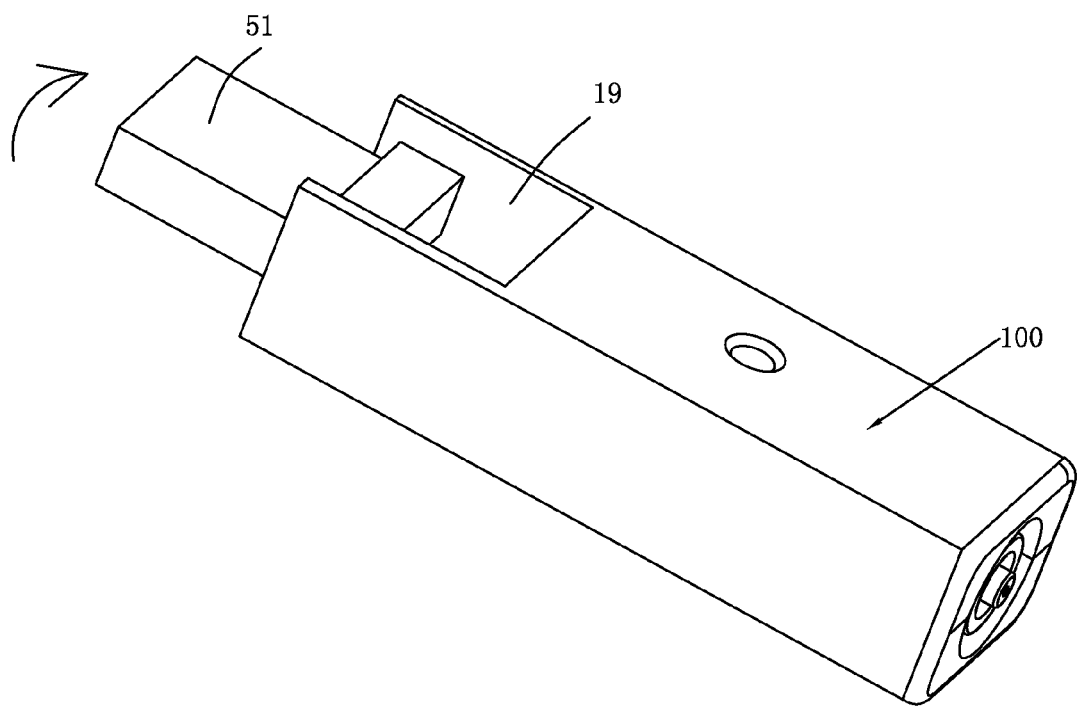
FIG. 12 is a using state view of an electronic cigarette charger of a fourth embodiment of the present invention.
Figure 13:
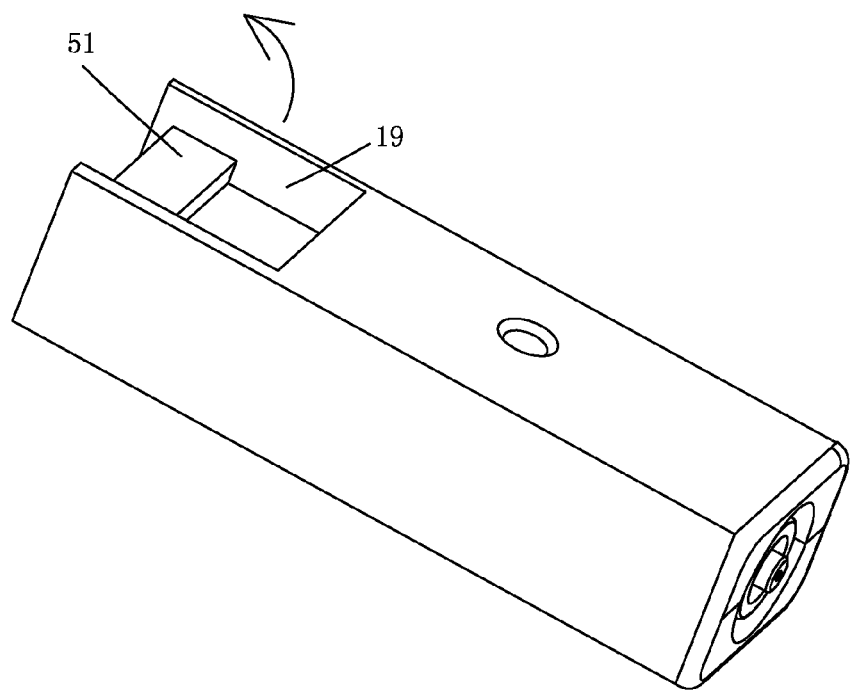
FIG. 13 is a non-using state view of an electronic cigarette charger of a fourth embodiment of the present invention.

As shown in FIG. 12 and FIG. 13, an electronic cigarette charger 100 of a fourth embodiment of the present invention has a similar structure as the electronic cigarette charger 100 of the first embodiment, the difference is that, the external power connector 5 adopts a rotatable structure, that is the power interface 51 of the external power connector 5 is pivoted to the case body 1 via a pivot, and the power interface 51 is electrically connected to the PCB board 76 of the power assembly 7 through conductive wires, the case body 1 defines a receiving slot at a corresponding position, the power interface 51 is capable of rotating about the pivot clockwise or counterclockwise to be remained in the receiving slot 19, and the rotation angle of the power interface 51 can reach 360 degrees.

Figure 14:
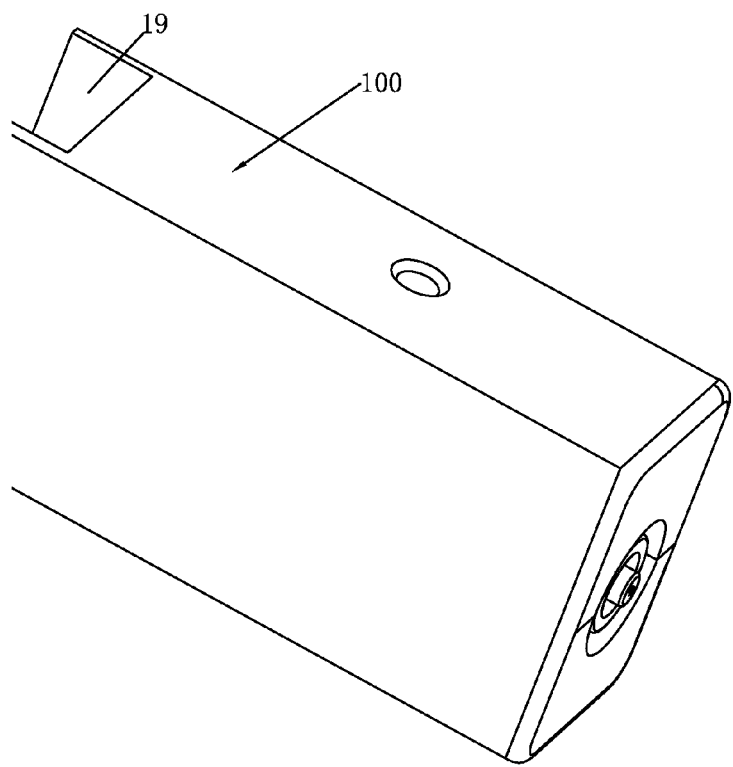
FIG. 14 is a using state view of an electronic cigarette charger of a fifth embodiment of the present invention.
Figure 15:
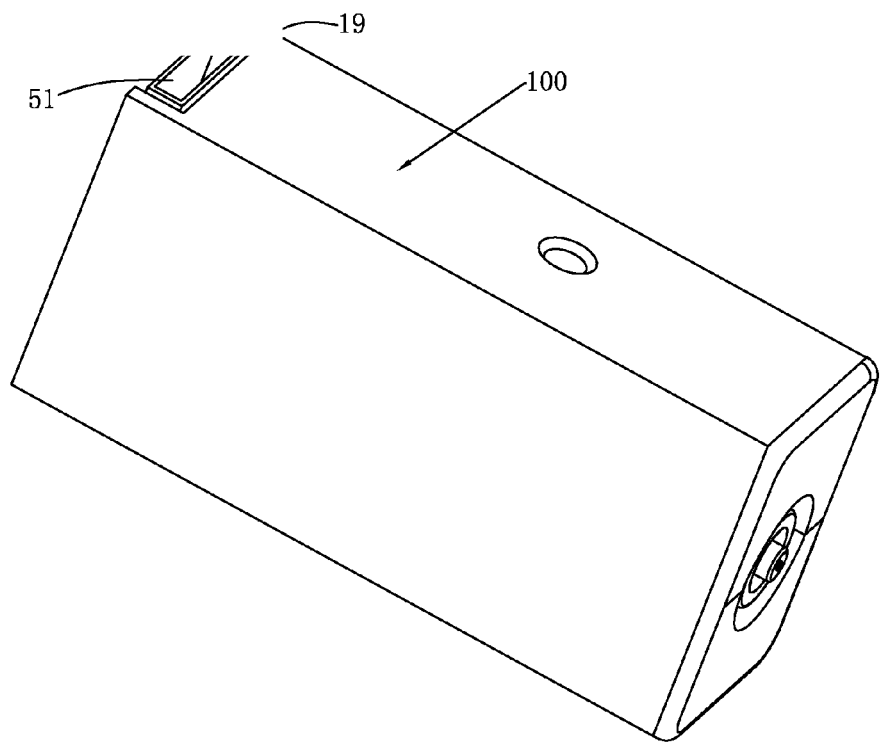
FIG. 15 is a non-using state view of an electronic cigarette charger of a fifth embodiment of the present invention.

As shown in FIG. 14 and FIG. 15, an electronic cigarette charger 100 of a fifth embodiment of the present invention has a similar structure as the electronic cigarette charger 100 of the fourth embodiment, the difference is that, the thickness of the case body 1 is correspondingly increased based on the length of the external power connector 5, and position of the receiving slot 19 is also adjusted accordingly, the rotation angle of the power interface 51 is 90 degrees.

The above-mentioned is only the embodiments of the present invention. It should be noted, for the persons of ordinary skill in this field, improvements and modifications within the spirit of the present invention can be made, and the improvements and modifications should be seemed to be included in the claimed scope of this invention.

What is claimed is:

1. An electronic cigarette device, comprising an electronic cigarette and an electronic cigarette charger adapted for charging the electronic cigarette, the electronic cigarette charger forming a first magnetic portion at a position of docking with the electronic cigarette, the electronic cigarette correspondingly forming a second magnetic portion mutually magnetically adsorbed with the first magnetic portion in order to make the electronic cigarette and the electronic cigarette charger to be stably docked;

the electronic cigarette charger forms a first connector at the position of docking with the electronic cigarette, and the first connector comprises a first seat, a first electrode pole disposed at a middle portion of the first seat and a first insulating sleeve disposed between the first seat and the first electrode pole to insulate the first seat and the first electrode pole;

the electronic cigarette comprises a power rod, the power rod as a whole is cylindrical, the power rod forms an electronic cigarette battery therein, the power rod at one end thereof further forms a second connector connected with the electronic cigarette battery and docked with the first connector of the electronic cigarette charger;

the second connector comprises a second seat, a second electrode pole disposed at a central portion of the second seat and a second insulating sleeve disposed between the second seat and the second electrode pole for insulating the second seat and the second electrode pole, and the second seat and the second electrode pole are respectively connected with the positive and negative of the electronic cigarette battery inside of the power rod;

the second electrode pole is extended through the second insulating sleeve, the second electrode pole forms a retaining ring at an end thereof close to an inside of the second seat, and the second electrode pole is sleeved with a spring at the end thereof close to the inside of the second seat, and opposite ends of the spring respectively abut against the retaining ring and an inner end-wall of the second seat to hold the second electrode pole in a protruding state.

2. The electronic cigarette device as described in claim 1, wherein the first seat is made of conductive magnet or magnetic material to construct the first magnetic portion, or the first connector forms an independent structural member thereon made of conductive magnet or magnetic material to construct the first magnetic portion.

3. The electronic cigarette device as described in claim 1, wherein the electronic cigarette charger comprises a case body and a power assembly disposed in the case body for charging the electronic cigarette.

4. The electronic cigarette device as described in claim 3, wherein the power assembly comprises the first connector, an external power connector and a printed circuit board (PCB) electrically connected with the first connector and the external power connector and having a charging control circuit, and the first seat of the first connector and the first electrode pole are electrically connected to the PCB through conductive wires.

5. The electronic cigarette device as described in claim 4, wherein the external power connector and the first connector are respectively disposed at opposite ends of the case body, and the case body forms a first locking slot in one end thereof for mounting the first connector.

6. The electronic cigarette device as described in claim 5, wherein the first locking slot further forms an embedded slot at an inner wall thereof for mounting the first seat, the first seat correspondingly forms a protruding ring at an outer wall thereof, and the first connector is embedded in the embedded slot by means of the protruding ring.

7. The electronic cigarette device as described in claim 4, wherein the external power connector is an USB (Universal Serial Bus) connector.

8. The electronic cigarette device as described in claim 4, wherein the external power connector is securely mounted to an end of the case body and protruded out of the case body.

9. The electronic cigarette device as described in claim 4, wherein the external power connector is movably mounted to an end of the case body and capable of being protruded out of the case body.

10. The electronic cigarette device as described in claim 9, wherein the external power connector is slidably and retractably disposed at said end of the case body; or the external power connector has a wiring structure, which comprises a power interface protruded out of the case body and conductive wires respectively electronically connected with the power interface and the PCB; or the external power connector has a rotatable structure, its power interface is pivoted to the case body and received in a corresponding receiving slot of the case body, and the power interface is electrically connected to the PCB through conductive wires.

11. The electronic cigarette device as described in claim 1, wherein the second seat is made of conductive magnet or magnetic material to construct the second magnetic portion, or the second connector forms an independent structural member thereon made of conductive magnet or magnetic material to construct the second magnetic portion.

12. The electronic cigarette device as described in claim 1, wherein an independently designed magnetic ring made of magnet or magnetic material is adopted as the first or second magnetic portion, the magnetic ring defines a central through hole for extension of the first or second electrode pole.

13. An electronic cigarette device comprising:
an electronic cigarette; and
an electronic cigarette charger adapted for charging the electronic cigarette;
the electronic cigarette charger forming a first magnetic portion at a position of docking with the electronic cigarette, the electronic cigarette correspondingly forming a second magnetic portion mutually magnetically adsorbed with the first magnetic portion in order to make the electronic cigarette and the electronic cigarette charger to be stably docked; the electronic cigarette charger forms a first connector at the position of docking with the electronic cigarette, and the first connector comprises a first seat and a first electrode pole insulated from each other by a first insulating sleeve; the electronic cigarette at one end thereof further forms a second connector docked with the first connector of the electronic cigarette charger; the second connector comprises a second seat and a second electrode pole, the second electrode pole forms a retaining ring at an end thereof close to an inside of the second seat, and the second electrode pole is sleeved with a spring at the end thereof close to the inside of the second seat, and opposite ends of the spring respectively abut against the retaining ring and an inner end-wall of the second seat to hold the second electrode pole in a protruding state.

14. The electronic cigarette device as described in claim 13, wherein at least one of the first and second seats is made of conductive magnet or magnetic material; or at least one of the first and second connectors forms an independent structural member thereon made of conductive magnet or magnetic material to construct a magnetic portion.

15. The electronic cigarette device as described in claim 14, wherein the independent structural member is a magnetic ring made of magnet or magnetic material.

* * * * *